United States Patent
Khouderchah et al.

(10) Patent No.: US 9,026,677 B2
(45) Date of Patent: May 5, 2015

(54) METHOD AND APPARATUS FOR PROVIDING VIDEO ON DEMAND

(75) Inventors: Michel Khouderchah, Cupertino, CA (US); Chandrasekar Krishnamurthy, Sunnyvale, CA (US); John Ellis, Pleasanton, CA (US); Jan Medved, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 979 days.

(21) Appl. No.: 11/378,993

(22) Filed: Mar. 17, 2006

(65) Prior Publication Data
US 2007/0220163 A1    Sep. 20, 2007

(51) Int. Cl.
G06F 15/16 (2006.01)
G06F 15/173 (2006.01)
(Continued)

(52) U.S. Cl.
CPC ........... *H04N 7/17336* (2013.01); *H04N 7/167* (2013.01); *H04N 21/2221* (2013.01); *H04N 21/23109* (2013.01); *H04N 21/234309* (2013.01); *H04N 21/2347* (2013.01); *H04N 21/2387* (2013.01); *H04N 21/2393* (2013.01); *H04N 21/2543* (2013.01); *H04N 21/25891* (2013.01); *H04N 21/47202* (2013.01); *H04N 21/6377* (2013.01); *H04N 21/6437* (2013.01); *H04N 21/64707* (2013.01); *H04N 21/6543* (2013.01); *H04N 21/6581* (2013.01); *H04N 21/6582* (2013.01)

(58) Field of Classification Search
CPC .................. H04N 21/2343; H04N 21/234309; H04N 21/47202; H04N 21/6582; H04L 29/06027; H04L 65/4084; H04L 67/1008; H04L 67/2823

USPC ......... 709/231, 203, 217, 219, 224, 226, 232, 709/246; 725/1, 4, 86, 87, 91, 104, 143, 725/145

See application file for complete search history.

(56) References Cited

U.S. PATENT DOCUMENTS 6,407,680 B1   6/2002  Lai et al.
6,452,973 B1 *  9/2002  Hwang .................... 375/240.27
(Continued)

FOREIGN PATENT DOCUMENTS

WO    WO02084971        10/2002
WO    WO-02084971 A2    10/2002
WO    WO-2007108845 A1   9/2007

OTHER PUBLICATIONS

European Application No. 06845562.5, office action mailed Nov. 23, 2009, 3 pgs.

(Continued)

*Primary Examiner* — Philip Chea
*Assistant Examiner* — Mohammed Ahmed

(57) ABSTRACT

A session border controller includes a first port to communicate with a user using a first signaling protocol, a second port to communicate with a content provider using a second signaling protocol, and a processor coupled to the first and second ports. The session border controller may send a PLAY message to the content provider to begin delivery of a content destined for the user. The session border controller may further receive a first media stream including the content and content provider information from the content provider. The session border controller may further create a second media stream that includes the content without the content provider information, and deliver the second media stream to the user.

16 Claims, 4 Drawing Sheets

(51) Int. Cl.

| | | |
|---|---|---|
| *H04N 7/173* | (2011.01) | |
| *H04N 7/167* | (2011.01) | |
| *H04N 21/222* | (2011.01) | |
| *H04N 21/231* | (2011.01) | |
| *H04N 21/2343* | (2011.01) | |
| *H04N 21/2347* | (2011.01) | |
| *H04N 21/2387* | (2011.01) | |
| *H04N 21/239* | (2011.01) | |
| *H04N 21/2543* | (2011.01) | |
| *H04N 21/258* | (2011.01) | |
| *H04N 21/472* | (2011.01) | |
| *H04N 21/6377* | (2011.01) | |
| *H04N 21/6437* | (2011.01) | |
| *H04N 21/647* | (2011.01) | |
| *H04N 21/6543* | (2011.01) | |
| *H04N 21/658* | (2011.01) | |

(56) References Cited

U.S. PATENT DOCUMENTS

| | | | |
|---|---|---|---|
| 6,604,224 B1* | 8/2003 | Armstrong et al. | 714/819 |
| 6,658,568 B1 | 12/2003 | Ginter et al. | |
| 6,785,704 B1 | 8/2004 | McCanne | |
| 6,970,602 B1* | 11/2005 | Smith et al. | 382/232 |
| 2002/0023021 A1* | 2/2002 | De Souza | 705/26 |
| 2002/0029384 A1* | 3/2002 | Griggs | 725/46 |
| 2002/0046406 A1* | 4/2002 | Chelehmal et al. | 725/87 |
| 2002/0053081 A1* | 5/2002 | Griggs | 725/39 |
| 2002/0169823 A1* | 11/2002 | Coulombe et al. | 709/203 |
| 2003/0028643 A1* | 2/2003 | Jabri | 709/226 |
| 2003/0093799 A1* | 5/2003 | Kauffman et al. | 725/86 |
| 2003/0158913 A1* | 8/2003 | Agnoli et al. | 709/219 |
| 2003/0182388 A1* | 9/2003 | Alexander et al. | 709/213 |
| 2003/0211889 A1* | 11/2003 | Walker et al. | 463/42 |
| 2004/0068751 A1 | 4/2004 | Basawapatna et al. | |
| 2004/0125757 A1* | 7/2004 | Mela et al. | 370/261 |
| 2004/0168184 A1* | 8/2004 | Steenkamp et al. | 725/31 |
| 2004/0184432 A1* | 9/2004 | Gateva et al. | 370/349 |
| 2004/0190607 A1 | 9/2004 | Wakimoto et al. | |
| 2004/0193648 A1* | 9/2004 | Lai et al. | 707/104.1 |
| 2005/0010697 A1* | 1/2005 | Kinawi et al. | 710/1 |
| 2005/0068992 A1 | 3/2005 | Kaku et al. | |
| 2005/0132264 A1* | 6/2005 | Joshi et al. | 715/500.1 |
| 2005/0232284 A1* | 10/2005 | Karaoguz et al. | 370/401 |
| 2005/0276284 A1* | 12/2005 | Krause et al. | 370/538 |
| 2006/0002418 A1* | 1/2006 | Jennings | 370/443 |
| 2006/0021057 A1* | 1/2006 | Risan et al. | 726/26 |
| 2006/0031301 A1* | 2/2006 | Herz et al. | 709/206 |
| 2006/0036750 A1* | 2/2006 | Ladd et al. | 709/229 |
| 2006/0112188 A1* | 5/2006 | Albanese et al. | 709/238 |
| 2006/0155839 A1* | 7/2006 | Hundscheidt et al. | 709/224 |
| 2006/0272028 A1* | 11/2006 | Maes | 726/27 |
| 2007/0094691 A1* | 4/2007 | Gazdzinski | 725/62 |
| 2007/0101377 A1* | 5/2007 | Six et al. | 725/86 |
| 2007/0118618 A1* | 5/2007 | Kisel et al. | 709/219 |
| 2007/0118849 A1* | 5/2007 | Kisel et al. | 725/25 |
| 2007/0124416 A1* | 5/2007 | Casey et al. | 709/217 |
| 2007/0124781 A1* | 5/2007 | Casey et al. | 725/94 |
| 2007/0211716 A1* | 9/2007 | Oz et al. | 370/389 |
| 2007/0268164 A1* | 11/2007 | Lai et al. | 341/51 |
| 2007/0291106 A1* | 12/2007 | Kenrick et al. | 348/14.01 |
| 2007/0291776 A1* | 12/2007 | Kenrick et al. | 370/401 |
| 2008/0151918 A1* | 6/2008 | Foti | 370/410 |
| 2009/0031032 A1* | 1/2009 | Shanmugham | 709/229 |
| 2009/0041155 A1* | 2/2009 | Sugai et al. | 375/299 |
| 2009/0138966 A1* | 5/2009 | Krause et al. | 726/21 |
| 2009/0292712 A1* | 11/2009 | Andersson et al. | 707/100 |
| 2010/0005187 A1* | 1/2010 | Breiter et al. | 709/231 |
| 2010/0036748 A1* | 2/2010 | Siegel et al. | 705/26 |
| 2010/0199311 A1* | 8/2010 | Chang et al. | 725/46 |

OTHER PUBLICATIONS

Application Serial No. 06845562.5, Communication Pursuant to Article 94(3) EPC, mailed Feb. 6, 2009, 2 p.

European Application Serial No. 06845562.5, Office Action mailed Jun. 8, 2010, 4 pgs.

European Application Serial No. 06845562.5, Office Action Response Filed Dec. 14, 2010, 16 pgs.

"European Application Serial No. 06845562.5, Communication Pursuant to Article 94(3) EPC mailed May 27, 2011", 5 pgs.

De Lattre, A., et al., "VideoLAN Streaming Howto", URL:http://www.videolan.org/doc/streaming-howto/en/, (2002), 66 pgs.

* cited by examiner

US 9,026,677 B2

METHOD AND APPARATUS FOR PROVIDING VIDEO ON DEMAND

FIELD

The present invention relates to systems and methods for providing content to users over networks, and in particular to a method and system for using a session border controller to facilitate providing the content.

BACKGROUND

A session border controller (SBC) is a piece of network equipment or a collection of functions that control real-time session traffic at the signaling, call-control, and packet layers as they cross a notional packet-to-packet network border between networks or between network segments. An SBC may consolidate interconnect points, provide and enforce QoS metrics, interwork between protocols, and provide a more secure connection for intersite calling. SBCs may address the inability of real-time session traffic to cross network address translation (NAT) device or firewall boundaries.

Multimedia content, such as video on demand (VOD) may be requested and controlled using real-time stream protocol (RTSP) as a signaling protocol. The content may be delivered using real-time transport protocol (RTP), a protocol for the transport of real-time data, such as audio and video. Some user may wish to use session initiation protocol (SIP) as a signaling protocol to request and control multimedia content that may be available from content providers that use RTSP.

SUMMARY

A session border controller includes a first port to communicate with a user using a first signaling protocol, a second port to communicate with a content provider using a second signaling protocol, and a controller. The controller may send a PLAY message to the content provider to begin delivery of a content destined for the user. The controller may further receive a first media stream including the content and content provider information from the content provider. The controller may further create a second media stream that includes the content without the content provider information, and deliver the second media stream to the user.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
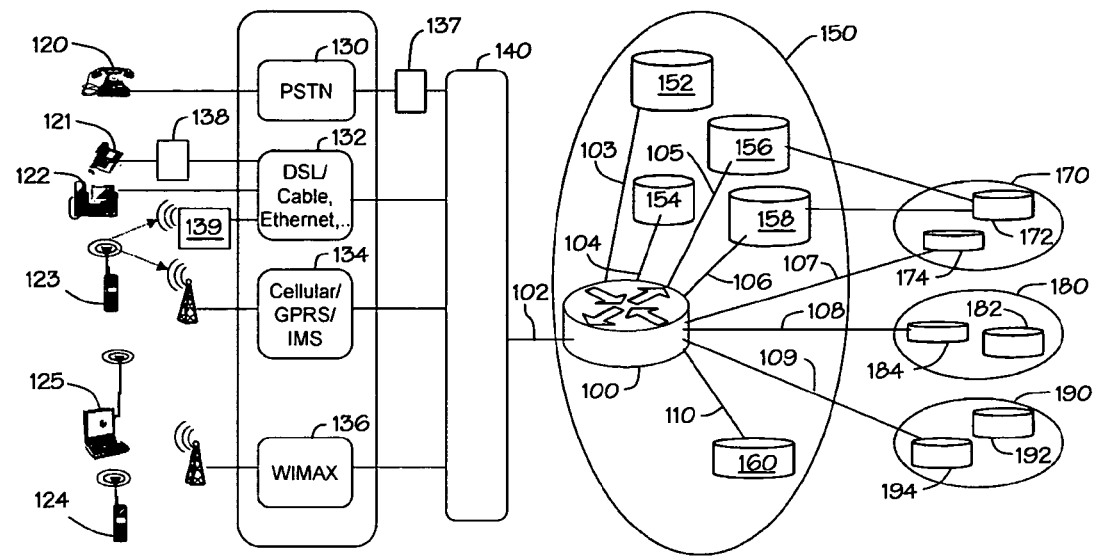
FIG. 1 is a diagram of a system that includes an embodiment of the invention.

FIG. 1 shows a multi-network system with a session border controller (SBC) 100 to interconnect the networks 102-110. The interconnected networks may be of any of a variety types as known in the art.

Users may access the interconnected networks using various types of terminal devices such as wired telephones 120-122, wireless telephones and personal digital assistants 123, 124, and personal computers 125. The terminal devices may include audio only devices, video only devices, and audio/video devices of a variety types as known in the art. Terminal devices may be connected by any of a variety of means such as the Public Switched Telephone Network (PSTN) 130, digital subscriber line (DSL), broadband cable, Ethernet 132, cellular networks, general packet radio service (GPRS), IP (internet protocol) Multimedia Subsystem (IMS) 134, and WIMAX networks 136 using IEEE 802.16 wireless standards. An analog telephone adapter (ATA) 138 may be used to interconnect an analog terminal device to a digital connection. A voice over internet protocol (VOIP) gateway 137 may be used to convert time division multiplexed (TDM) traffic to VOIP. A wireless local area network (LAN) access point 139 may be used to connect wireless terminal devices. An aggregation router 140 may connect a number of the networks 130-136 for the terminal devices 120-125 to a high speed network 102 that is connected to the SBC 100.

The SBC 100 may be part of a service network 150 maintained by a service provider. The SBC 100 may interconnect a variety of servers that cooperate to provide service to users via their terminal devices 120-125. The service network 150 may include session initiation protocol (SIP) servers 152 that provide proxy, registrar, redirect, and location database services. The service network 150 may further include bandwidth manager servers 154 to select and control the network resources to manage the traffic on the network. The service network 150 may further include database servers 156 that provide user service profiles and content directories. The service network 150 may further include billing servers 158 to collect billing records used to bill users for the services provided by the service network.

One of the services provided by the service network 150 may be providing multimedia content such as streaming audio and video, audio and video on demand. The service network 150 may include local content servers 160 that provide multimedia content maintained by the service provider. The content servers may by controlled using real-time stream protocol (RTSP) and multimedia content may be delivered using real-time transport protocol (RTP).

The service network 150 may provide access to additional multimedia content acquired from content networks 170, 180, 190 that are maintained by content providers not under the control of the service provider. These content networks may include authentication, authorization, and accounting (AAA) servers 172, 182, 192 to control access to the content and accumulate charges for the use of the content. These content networks may further include content servers 174, 184, 194 that provide multimedia content maintained by the content providers. Theses content servers, like the local content server 160, may by controlled using real-time stream protocol (RTSP) and multimedia content may be delivered using real-time transport protocol (RTP).

The SBC 100 provides the interconnect between the content servers 174, 184, 194 maintained by content providers and the service network 150. Thus the SBC 100 is in a position to orchestrate delivery of multimedia content from a content server 160,174, 184, 194 to a user terminal device 120-125.

Figure 2:
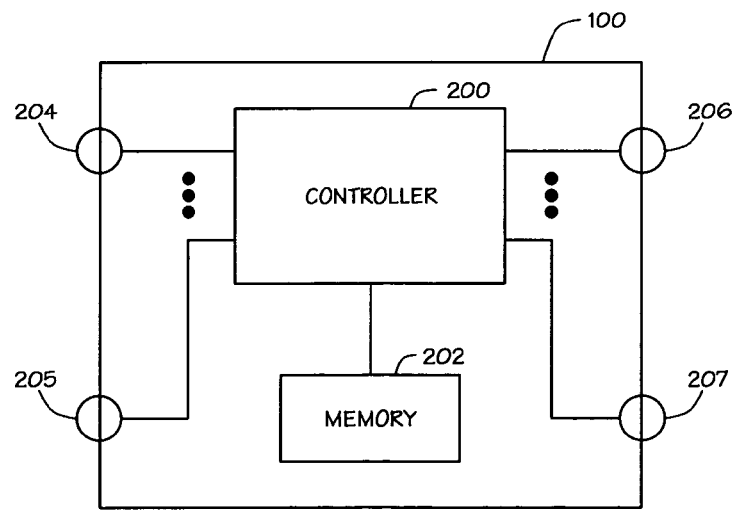
FIG. 2 is a block diagram of an embodiment of the invention.

As shown in FIG. 2, an SBC 100 may include two or more ports 204-207 that may be connected to two or more networks (102-110 as shown in FIG. 1) and a processor 200 to transfer messages received on one port to another port. A first port 204 may communicate with a user using a first signaling protocol. A second port 206 may communicate with a content provider using a second signaling protocol. The processor 200 may carry out various operations to modify the messages received from a sender on one port as required by the intended recipient before sending the message on another port to the recipient. The SBC 100 may include a memory 202 coupled to the processor 200. The memory 202 may be used by the processor to store or buffer messages or portions thereof, state information derived from processing activities, program instructions that control the operation of the processor, and other data used to carry out the operations of the processor.

Figure 3:
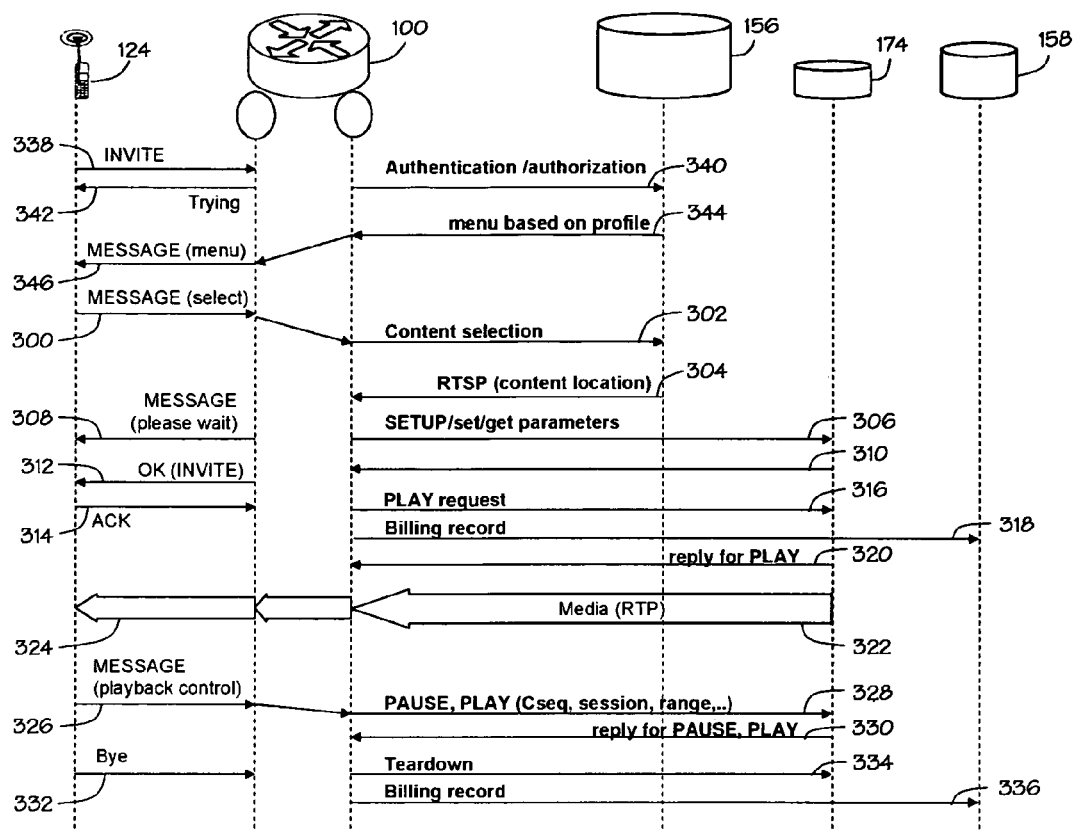
FIG. 3 is a diagram that illustrates a set of operations by an embodiment of the invention.

As illustrated in FIG. 3, the SBC 100 may receive a first selection message 300 for a content from the user 124. The first selection message may be an instant message that uses the session initiation protocol (SIP). The SBC 100 may send a message to a database server 156 with the user's content selection 302. The database server 156 may provide the SBC 100 with a location for the content selected by the user 304.

The SBC 100 may interact with the server of the content provider 174 that has the content selected by the user 304. The SBC 100 may send a DESCRIBE request that includes the media filename to the content provider 174 and receive an associated response. The SBC 100 may send a second selection message for the content 306, such as a SETUP request, to the content provider 174. The messages between the SBC 100 and the content provider may be transmitted using real-time stream protocol (RTSP). The SBC 100 may transcode the first selection message and combine it with other information such as the location for the content as provided by the database server to generate the second selection message. The SBC 100 may send a MESSAGE asking the user to wait 308 to indicate that the content request has been received and is being processed.

The SBC 100 may maintain a state for the first port 204, which is connected to the user. The state may be maintained in the memory 202 of the SBC 100. The state may be used with the received messages to generate the messages to be sent. Thus the SBC 100 provides stateful internetworking in which the transcoding may depend both on the message received and a state determined by preceding messages received or sent that relate to the first port.

The SBC 100 may receive a reply message 310 from the content provider 174 in response to the second selection message when the requested content is ready to be transmitted. The SBC 100 may transcode this message and send an OK message to the user 312 after receiving the ready indication in the reply message 310. The reply message may include information that identifies the content provider or the location of the content. Messages generated by the SBC 100 to be sent to the user may hide information that would identify the content provider, the location of the content, and/or that interworking of signaling protocols is occurring. Hiding information may make certain attacks on the content provider more difficult to initiate. The state maintained by the SBC 100 may preserve information hidden from the users so that it may be used to generate and send messages to the content provider on behalf of the user.

The SBC 100 may receive an ACK message 314 from the user when the user is prepared to receive the requested content. The SBC 100 may send a PLAY request 316 to the content provider 174 after receiving the ACK message, to begin the delivery of the content. The SBC 100 may further send a billing record 318 to a billing server 158 to provide a record of the start of a request for content. The content provider 174 may send a reply message for the PLAY request 320 to the SBC 100 when the content is ready to be delivered.

The SBC 100 may receive a first media stream 322 from the content provider 174. The first media stream 322 may include the content and content provider information. The SBC 100 may create a second media stream 324 that includes the content without the content provider information and deliver the second media stream to the user 124.

The second media stream 324 may or may not use the same format as the first media stream 322. If the second media stream 324 uses a different format than the first media stream 322, the SBC 100 may transcode the first media stream from a first format to a second format for the second media stream. The SBC 100 may select the content provider from a plurality of content providers, each of which has the requested content. The content provider may be chosen by the SBC 100 according to a local policy such that the first media stream provided by the content provider has a first format that is easiest to transcode to the second format. Easiest to transcode may mean that the transcoding take the least time to transcode of the available formats or it may be judged as easiest by another metric such as processing resources required. Selection of content provider may also include selecting from a plurality of content locations having different formats where the content locations are controlled by the same content provider.

The SBC 100 may receive an encryption key for the requested content from the content provider 174 and/or from a database server 156 that may provide local policy information on content distribution. The SBC 100 may encrypt the first media stream 322 with the encryption key to create the second media stream 324 if the first port 204 is connected to an untrusted access network 102. If the first port is connected to a trusted access network, the SBC 100 may transmit the second media stream 324 in the clear and avoid the overhead of using encrypted content when not required.

Some content may be provided by the content provider 174 in an encrypted format. The SBC 100 may use the encryption key from the content provider 174 to decrypt the content before transcoding the first media stream 322 to create the second media stream 324. The SBC may re-encrypt the second media stream 324 prior to delivery to the user using either an encryption key provided by the content provider 174 or an encryption key maintained by the network service provider. Encryption keys maintained by the network service provider may be provided to the SBC by a local server 156.

The user 124 may send one or more messages with playback control requests 326 to the SBC 100. The SBC may transcode the playback control requests 328 and send the request to the content provider 174. Playback control messages may provide for actions such as pause, rewind, and fast forward. The content provider may provide an acknowledgment of the playback control 330 to the SBC 100. The SBC may or may not provide a transcoded acknowledgment to the user 124.

The user 124 may send a Bye message 332 or otherwise signal a termination of the request for the content to the SBC 100. The SBC 100 may then send a teardown message 334 to the content provider 174. The SBC 100 may further send a billing record 336 to a billing server 158 to provide a record of the end of the request for content.

The SBC 100 may create one or more detail billing records 318, 336 in response to the transactions between the user 124 and the content provider 174. A detail billing record may include an identifier of the content provider, a content type indicator, and/or associated statistics. The associated statistics may include number of packets sent/received, jitter, and/or latency. The associated statistics may be as measured by the SBC 100 and/or captured from RTCP statistics generated by the endpoints. The SBC may send detail billing records to a billing server 158. The detail billing records created by the SBC 100 may be compared to reported statistics provided by endpoints. The SBC 100 may include the comparison information in the detail billing records sent to the billing server 158.

Prior to accepting a selection message 300 for a content from the user 124, the user may need to complete authentication, authorization, and accounting (AM) transactions before accessing content through the service provider network 150. The user 124 may initially send an INVITE message 338 to the SBC 100 signaling a desire to access content. The SBC 100 may send a message 340 to a database server 156 with the user's identifying information. The SBC 100 may send a trying message 342 to indicate that the access request has been received and is being processed.

The database server 156 may provide the SBC 100 with a menu for content based on the user's profile 344. This may allow the SBC 100 to determine what format to use for messages to be delivered to the user 124. For example, the user may have a profile that indicates that the user's terminal device is audio only; the SBC 100 would then transcode messages to deliver than in a format suitable for audio only presentation. The user 124 may send a selection for content from the menu 300 to the SBC 100 which the SBC obtains and delivers to the user as previously described.

Figure 4:
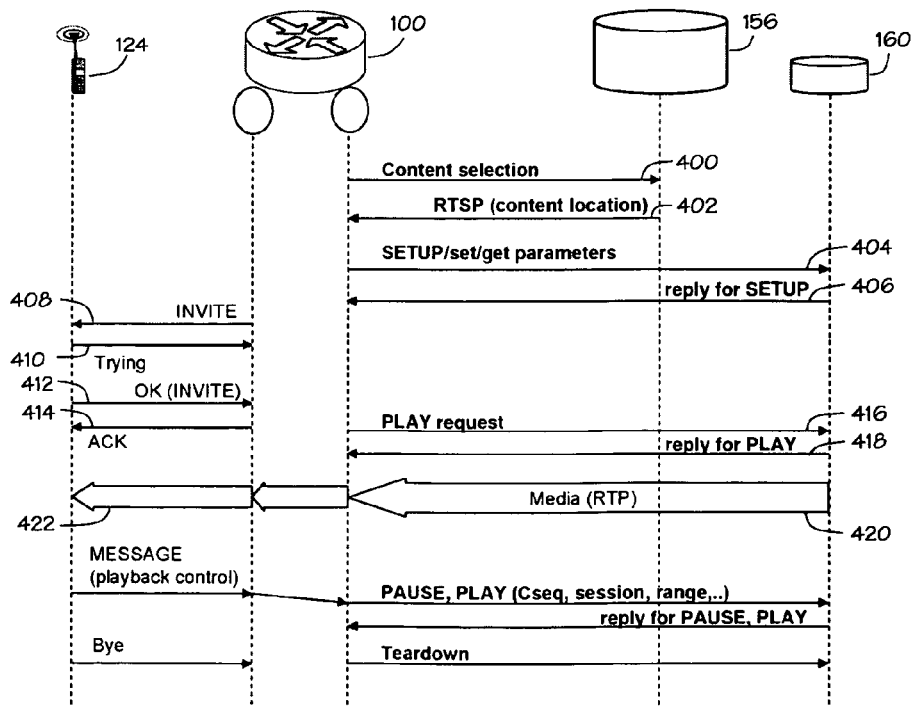
FIG. 4 is a diagram that illustrates another set of operations by an embodiment of the invention.

As shown in FIG. 4, the SBC 100 may push content to a user 124 as an alternative to providing content in response to a user request. The SBC 100 may push content that is unsolicited by the user, such as content delivered at the request of the service provider, a content provider, or a third party, or content that is delivered in response to some user action other than an explicit request for content.

To push content, the SBC 100 may begin by exchanging messages 400, 402 with the database server 156 to locate the content to be delivered to the user. The SBC 100 may send a SETUP request 404 to the content server 160 acting as the content provider requesting the content to be delivered to the user. The content server 160 may send a reply message 406 for the SETUP request to the SBC 100 indicating that the content is available.

The SBC 100 may send an INVITE request 408 to the user 124 seeking permission to deliver the content. The user 124 may send a trying message 410 to indicate that the INVITE request has been received and is being processed.

If the user sends an OK message 412, the SBC 100 will generate a PLAY request 416 and send it to the content server 160. This will cause the content server 160 to begin the delivery of the content. The content server 160 may send a reply message for the PLAY request 418 to the SBC 100 when the content is ready to be delivered. The SBC 100 may receive a first media stream 420 from the content server. The first media stream may include the content and content server information. The SBC 100 may create a second media stream that includes the content without the content server information and deliver the second media stream to the user. Playback control and termination may be handled as previously described for user selected content. Pushed content may use the multicasting or broadcasting techniques described above.

FIG. 4 illustrates push content that is provided by the network service provider 150 and delivered at no charge to the user 124. Therefore no detail billing records are generated. Push content may make use of content from a content provider and detail billing record may be generated by the SBC 100 for the purpose of accounting for payments to the content provider. Push content may be delivered with a charge to the user 124 or to a third party that contracts with the network service provider to deliver the push content. Detail billing records may be generated for the purpose of accounting for payments to the network service provider for delivery of the push content.

Figure 5:
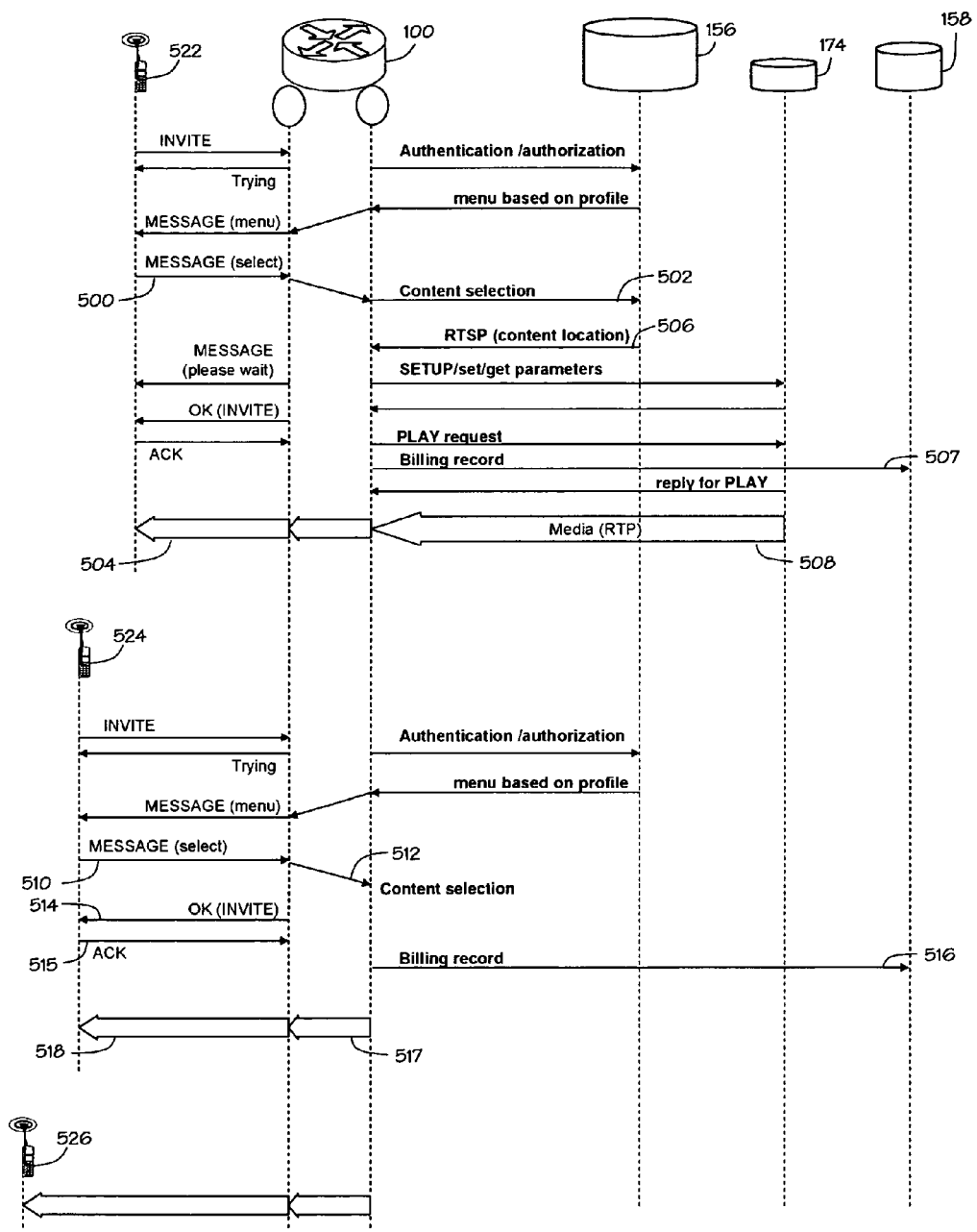
FIG. 5 is a flowchart for a method that embodies of the invention.

FIG. 5 illustrates a form of multicast broadcasting. A first user 522 may select 500 broadcast content that is being delivered in real-time. The first user 522 may complete authentication, authorization, and accounting (AAA) transactions and make a selection as previously described in connection with FIG. 3. The SBC 100 may obtain and deliver the selected content to the first user 522 using similar transactions as previously described in connection with FIG. 3.

If a second user 524 selects 510 the same broadcast content that is being delivered to the first user 522, the SBC 100 may recognize the content selection 512 as one for content that is already being received. The SBC 100 may bypass the steps of obtaining the content location 506 and the first media stream with the content 508 that were previously done to respond to the selection 500 by the first user 522. The SBC 100 may respond directly to the second user's select message 510 with an OK invite message 514.

Upon receipt of the second user's ACK message 515 the SBC 100 may begin delivering the first media stream 508 as obtained for the first user 522 as a third media stream 518 directed to the second user 524. The SBC 100 may transcode the first media stream 508 to create the third media stream 518 in the format needed for the second user 524. If the first and second users 522, 524 require the same format for the media stream, the controller may send the same media stream to both users without the need to transcode the content for the second user. Multicasting can accommodate an arbitrary number of users 526 who all receive the same broadcast content 508. The third and subsequent users 526 are each handled in the same way as the second user 524.

The SBC 100 may support playback control features such as pause or rewind for content that is being delivered as a multicast broadcast. Support of playback control features may be only for selected broadcast content. If a user is receiving content as a member of a group of users receiving a multicast broadcast and then invokes a playback control, the SBC 100 will remove that user from the multicast group and request a separate content stream for that user to allow the use of the playback controls. If the user later returns to the real-time delivery of the broadcast content, the SBC 100 may rejoin the user with the multicast group. The SBC 100 may generate additional billing records for the use of playback control features. The multicast group will be maintained as long as any user, not necessarily the first user, continues to receive the broadcast content.

Figure 6:
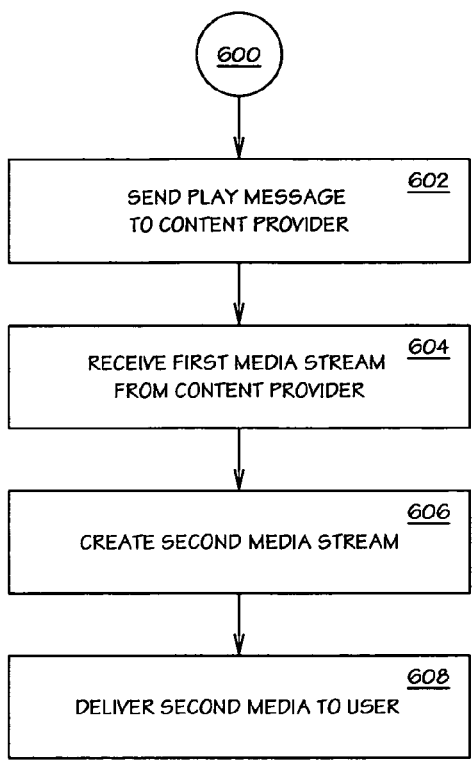
FIG. 6 is a flowchart for another method that embodies of the invention.

FIG. 6 is a flowchart of a method for delivering content from a session border controller to a user. A PLAY message is sent to a content provider to begin delivery of a content destined for the user 602. A first media stream including the content and content provider information is received from the content provider 604. A second media stream that includes the content without the content provider information is created 606. An encryption key may be received from the content provider and/or the local database server 156. The encryption key may be used to encrypt the first media stream to create the second media stream if the first port is connected to an untrusted access network. The second media stream is delivered to the user 608. Messages may be exchanged with the user using real-time transport protocol (SIP) as a first signaling protocol and with the content provider using real-time stream protocol (RTSP) as a second signaling protocol. A state may be maintained for the connection to the user, the state being used with messages from the user for creating messages to be sent to the content provider.

Figure 7:
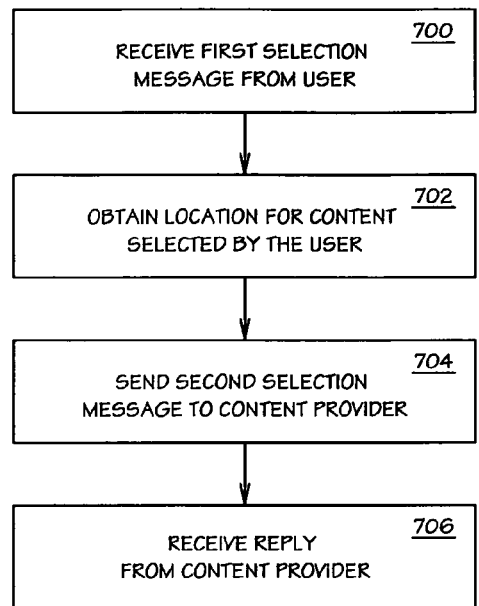
FIG. 7 is a flowchart for another method that embodies of the invention.

FIG. 7 is a flowchart of a method for initiating the delivery of content from a session border controller to a user based on a content selection by the user. A first selection message for the content is received from the user 700. A message is sent to a database server to obtain a location for the content selected by the user 702. The location may be selected from a plurality of locations such that the first media stream has a first format that is easiest to transcode to a second format of the second media stream.

A second selection message including a request for the content is sent to a content provider 704. A reply to the content request indicating "ready" is received from the content provider 706. An OK message is sent to the user after receiving the ready message 708. An ACK message is received from the user 710 indicating that the user is ready to receive the selected content. The content thus selected may be sent to the user using the method shown in FIG. 6. The same content may be sent to a second user in response to a third selection message for the content received from the second user.

Figure 8:
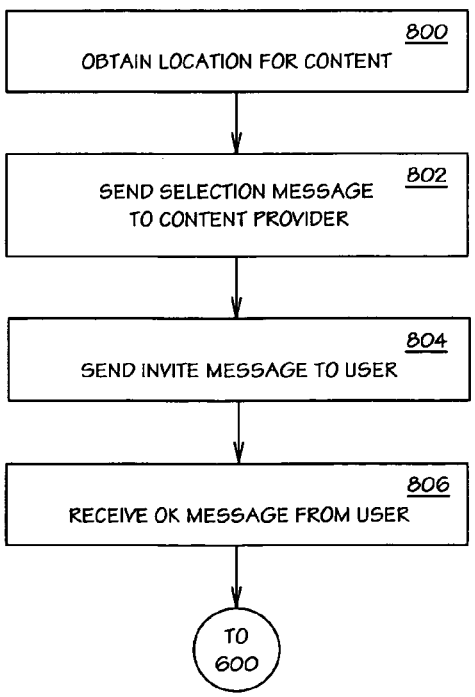

FIG. 8 is a flowchart of another method for initiating the delivery of content from a session border controller to a user in which the user does not initiate the delivery. A location for the content is obtained from a database server 800. A selection message for the content is sent to a content provider 802. An INVITE message is sent to the user when the content is ready to be delivered 804. An OK message is received from the user before sending the PLAY message to the content provider 806. The content thus selected may be sent to the user using the method shown in FIG. 6. The same content may be sent to more than one user.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A session border controller comprising:
    a first port to enable the session border controller to communicate with a user;
    a second port to enable the session border controller to communicate with a selected content provider among a plurality of content providers;
    a processor coupled to the first port and to the second port, the processor configured to:
    receive an authentication message identifying a user;
    provide a listing of content based on the user;
    choose the selected content provider from among the plurality of content providers upon receipt of a selection of the content from the listing of content, the plurality of content providers storing the selected content in differing formats, wherein:
    choosing the selected content provider is based on an amount of processing resources required to transcode the selected content from the differing formats into a format for the user, and
    the processing resources comprising a least amount of time required to transcode the content from the differing formats to the format for the user, the processor being further configured to:
    enable the session border controller to send a PLAY message to the content provider to begin delivery of the selected content,
    receive a first media stream including the selected content and content provider information from the selected content provider,
    transcode the first media stream to create a second media stream that has a different format than the first media stream and that includes the content without the content provider information, and
    deliver the second media stream to the user.

2. The session border controller of claim 1 further comprising:
    a third port to communicate with a database server, wherein the processor is coupled to the third port, the processor further to receive a first selection message for the content from the user, obtain a location for the content selected by the user from a database server, send a second selection message for the content to the content provider, receive a reply message from the content provider in response to the second selection message indicating that the content is ready, send an OK message to the user after receiving the reply message, and receive an ACK message from the user before sending the PLAY message to the content provider.

3. The session border controller of claim 1 wherein communications over the first port use a session initiation protocol (SIP) and communications over the second port use a real-time stream protocol (RTSP).

4. The session border controller of claim 1 wherein the processor is further to receive an encryption key from the content provider and wherein creating the second media stream encrypts the first media stream with the encryption key if the first port is connected to an untrusted access network.

5. The session border controller of claim 1 wherein the processor is further to maintain a state for the first port, the state being determined by preceding messages received or sent that relate to the first port, the state being used with messages from the user to create messages to be sent to the content provider.

6. The session border controller of claim 1 wherein the processor is further to create a detail billing record including an identifier of the content provider, a content type indicator, and associated statistics.

7. The session border controller of claim 1 further comprising: a third port to communicate with a second user using a first signaling protocol; and wherein the processor is further to receive a third selection message for the content from the second user, and deliver the second media stream to the second user without sending a second PLAY message to the content provider to begin delivery of the content destined for the second user.

8. The session border controller of claim 1 wherein the processor is further to obtain a location for the content from a database server, send a selection message for the content to a content provider, send an INVITE message to the user when the content is ready to be delivered, and receive an OK message from the user before sending the PLAY message to the content provider.

9. A method for delivering content from a session border controller to a user, the method comprising
    receiving an authentication message identifying a user;
    providing a listing of content based on the user;

receiving a selection of content from the listing of content;
selecting a content provider from among a plurality of content providers, the plurality of content providers storing the selected content in differing formats, based on an amount of processing resources required to transcode the selected content from the differing formats into a format for the user,
the processing resources comprising a least amount of time required to transcode the content from the differing formats to the format for the user;
sending a PLAY message to the selected content provider to begin delivery of the selected content destined for the user;
receiving a first media stream including the selected content and content provider information from the content provider;
transcoding the first media stream to create a second media stream that has a different format than the first media stream and that includes the content without the content provider information; and
delivering the second media stream to the user.

10. The method of claim 9 further comprising:
obtaining a location for the content selected by the user from a database server;
sending a second selection message for the content to a content provider;
receiving a reply message from the content provider in response to the second selection message indicating that the content is ready;
sending an OK message to the user after receiving the reply message; and
receiving an ACK message from the user before sending the PLAY message to the content provider.

11. The method of claim 10 wherein messages are exchanged with the user using real-time transport protocol (SIP) as a first signaling protocol and messages are exchanged with the content provider using real-time stream protocol (RTSP) as a second signaling protocol.

12. The method of claim 9 further comprising receiving an encryption key from the content provider and wherein creating the second media stream includes encrypting the first media stream with the encryption key if a first port connected to the user accesses an untrusted access network.

13. The method of claim 9 further comprising maintaining a state for a first port, the state being determined by preceding messages received or sent that relate to the first port, the state being used with messages from the user for creating messages to be sent to the content provider.

14. The method of claim 9 further comprising creating a detailed billing record including an identifier of the content provider, a content type indicator, and associated statistics.

15. The method of claim 9 further comprising:
receiving a third selection message for the content from a second user; and
delivering the second media stream to the second user without sending a second PLAY message to the content provider to begin delivery of the content destined for the second user.

16. The method of claim 9 further comprising:
obtaining a location for the content from a database server;
sending a selection message for the content to the selected content provider;
sending an INVITE message to the user when the content is ready to be delivered; and
receiving an OK message from the user before sending the PLAY message to the content provider.

* * * * *